United States Patent
Pakki et al.

(10) Patent No.: US 12,259,897 B2
(45) Date of Patent: Mar. 25, 2025

(54) COMMUNICATION SYSTEM WITH CONSOLIDATED USER INTERFACE FOR DATALINK MESSAGES

(71) Applicant: Honeywell International Inc., Charlotte, NC (US)

(72) Inventors: Sathish Pakki, Bangalore (IN); Donna Bost, Scottdale, AZ (US); Stepan Vrsa, Brno (CZ); Lakshmi Venkata Chandra Sekhar Thulluru, Bangalore (IN)

(73) Assignee: Honeywell International Inc., Charlotte, NC (US)

( * ) Notice: Subject to any disclaimer, the term of this patent is extended or adjusted under 35 U.S.C. 154(b) by 325 days.

(21) Appl. No.: 17/862,170

(22) Filed: Jul. 11, 2022

(65) Prior Publication Data
US 2023/0350910 A1    Nov. 2, 2023

(30) Foreign Application Priority Data
May 2, 2022   (IN) .............................. 202211025545

(51) Int. Cl.
  *G06F 16/25*   (2019.01)
  *G06F 16/23*   (2019.01)
  *G08G 5/00*    (2006.01)
(52) U.S. Cl.
  CPC .......... *G06F 16/252* (2019.01); *G06F 16/235* (2019.01); *G08G 5/0004* (2013.01); *G08G 5/0021* (2013.01)
(58) Field of Classification Search
  None
  See application file for complete search history.

(56) References Cited

U.S. PATENT DOCUMENTS

| | | |
|---|---|---|
| 6,313,759 B1 | 11/2001 | Musland-Sipper |
| 6,828,921 B2 | 12/2004 | Brown et al. |
| | (Continued) | |

FOREIGN PATENT DOCUMENTS

WO    2012110678 A1    8/2012

OTHER PUBLICATIONS

European Patent Office, "Extended European Search Report", from EP Application No. 23169424.1, from Foreign Counterpart to U.S. Appl. No. 17/862,170, filed Sep. 21, 2023, pp. 1 through 8, Published: EP.

(Continued)

*Primary Examiner* — Christian Chace
*Assistant Examiner* — Shayne M. Gilbertson
(74) *Attorney, Agent, or Firm* — Fogg & Power LLC (57) ABSTRACT

A vehicle communication system is provided. The system includes a modifiable database that contains customer defined messages to be downlinked. A user interface is provided that includes a downlink content display and user input functions that enable a user to select which of a plurality of downlink content messages provided in a consolidated panel layout of the downlink content display to include in a combined downlink content message. A communication controller determines a phase of travel and causes to be displayed a plurality of downlink content messages from the modifiable database based on the determined phase of travel on the downlink content display of the user interface and communicate a combined downlink content message of the user selected downlink content to a remote location via the transceiver upon activation of a send input on the user interface.

17 Claims, 7 Drawing Sheets

(56) References Cited

U.S. PATENT DOCUMENTS

| | | |
|---|---|---|
| 7,181,497 B1 | 2/2007 | Appelman et al. |
| 8,082,070 B2 | 12/2011 | Gunn et al. |
| 8,626,358 B2 | 1/2014 | McGuffin et al. |
| 8,633,913 B1 | 1/2014 | Raghu et al. |
| 8,755,952 B2 | 6/2014 | McGuffin et al. |
| 8,791,840 B2 | 7/2014 | McGuffin et al. |
| 9,223,413 B2 | 12/2015 | Pakki et al. |
| 9,224,301 B2 | 12/2015 | Pakki et al. |
| 9,547,929 B1* | 1/2017 | Whitlow .............. G08G 5/0026 |
| 10,771,558 B2 | 9/2020 | Shamasundar et al. |
| 2007/0129854 A1 | 6/2007 | Sandell et al. |
| 2008/0163093 A1 | 7/2008 | Lorido |
| 2009/0041041 A1 | 2/2009 | True et al. |
| 2009/0089693 A1 | 4/2009 | Fahy |
| 2009/0228792 A1 | 9/2009 | Os et al. |
| 2009/0278806 A1 | 11/2009 | Duarte et al. |
| 2010/0188266 A1 | 7/2010 | Judd et al. |
| 2010/0229117 A1 | 9/2010 | Lee et al. |
| 2010/0262319 A1 | 10/2010 | Gunn et al. |
| 2010/0302277 A1 | 12/2010 | Jiang et al. |
| 2011/0102199 A1 | 5/2011 | McCullough |
| 2011/0289406 A1 | 11/2011 | Wässingbo |
| 2011/0307867 A1 | 12/2011 | Murthy |
| 2012/0054641 A1* | 3/2012 | Sae-Chim ............ G08G 5/0013 715/752 |
| 2012/0066617 A1* | 3/2012 | Gupta ..................... H04L 67/75 715/752 |
| 2012/0078447 A1 | 3/2012 | McGuffin et al. |
| 2012/0095623 A1 | 4/2012 | Barral et al. |
| 2012/0306772 A1 | 12/2012 | Tan et al. |
| 2013/0033387 A1 | 2/2013 | Trope |
| 2013/0113717 A1 | 5/2013 | Eerd et al. |
| 2013/0159429 A1 | 6/2013 | Nalliah et al. |
| 2015/0170492 A1* | 6/2015 | Zimmer ............... G08G 5/0021 340/964 |
| 2015/0212671 A1 | 7/2015 | Judy et al. |
| 2016/0035227 A1 | 2/2016 | Kumar et al. |
| 2016/0125744 A1 | 5/2016 | Shamasundar et al. |
| 2016/0155337 A1 | 6/2016 | Krishna et al. |
| 2016/0161283 A1 | 6/2016 | Shamasundar et al. |
| 2018/0292954 A1* | 10/2018 | Shamasundar ...... G08G 5/0052 |

OTHER PUBLICATIONS

European Patent Office, "Communication pursuant to Article 94(3) EPC from EP Application No. 15151691.1 mailed Jun. 16, 2017", "from Foreign Counterpart of U.S. Appl. No. 14/168,686", Jun. 16, 2017, pp. 1-8, Published in: EP.

European Patent Office, "Extend European Search Report from EP Application No. 15151691.1 mailed Jun. 8, 2015", "from Foreign Counter part of U.S. Appl. No. 14/168,686 ", Jun. 8, 2015, pp. 1-8, Published in: EP.

European Patent Office, "Summons to attend oral proceedings pursuant to Rule 115(1) EPC from EP Application No. U.S. Appl. No. 14/168,868 mailed Mar. 29, 2018", "from Foreign Counterpart of U.S. Appl. No. 14/168,686 ", Mar. 29, 2018, pp. 1-10, Published in: EP.

U.S. Patent and Trademark Office, "Advisory Action", U.S. Appl. No. 15/483,735, Jan. 13, 2020, pp. 1 through 3, Published: US.

U.S. Patent and Trademark Office, "Advisory Action", U.S. Appl. No. 15/483,735, Apr. 16, 2019, pp. 1 through 3, Published: US.

U.S. Patent and Trademark Office, "Final Office Action", U.S. Appl. No. 15/483,735, Jan. 29, 2019, pp. 1 through 26, Published: US.

U.S. Patent and Trademark Office, "Final Office Action", U.S. Appl. No. 15/483,735, Oct. 23, 19, pp. 1-25, Published: US.

U.S. Patent and Trademark Office, "Notice of Allowance", U.S. Appl. No. 15/483,735, May 5, 2020, pp. 1 through 7, Published: US.

U.S. Patent and Trademark Office, "Office Action", U.S. Appl. No. 15/483,735, May 17, 2019, pp. 1-22, Published: US.

U.S. Patent and Trademark Office, "Office Action", U.S. Appl. No. 15/483,735, Oct. 2, 2018, pp. 1 through 31, Published: US.

U.S.Patent and Trademark Office, "Office Action for U.S. Appl. No. 14/168,686", Sep. 23, 2015, pp. 1-26, Published in: US.

US Patent and Trademark Office, "Advisory Action for U.S. Appl. No. 14/168,686", Jun. 16, 2016, pp. 1-3, Published in: US.

US Patent and Trademark Office, "Advisory Action for U.S. Appl. No. 14/168,686", Sep. 20, 2017, pp. 1-2, Published in: US.

US Patent and Trademark Office, "Final Office Action for U.S. Appl. No. 14/168,686", Mar. 10, 2016, pp. 1-22, Published in: US.

US Patent and Trademark Office, "Final Office Action for U.S. Appl. No. 14/168,686", Jun. 14, 2017, pp. 1-17, Published in: US.

US Patent and Trademark Office, "Office Action for U.S. Appl. No. 14/168,686", Dec. 30, 2016, pp. 1-16, Published in: US.

US Patent and Trademark Office, "Office Action for U.S. Appl. No. 14/168,686", May 17, 2018, pp. 1-24, Published in: US.

* cited by examiner

COMMUNICATION SYSTEM WITH CONSOLIDATED USER INTERFACE FOR DATALINK MESSAGES

CROSS REFERENCE TO RELATED APPLICATION

This application claims benefit of Indian Provisional Application No. 202211025545 entitled "COMMUNICATION SYSTEM WITH CONSOLIDATED USER INTERFACE FOR DATALINK MESSAGES" and filed on May 2, 2022, the contents of which is incorporated herein in its entirety.

BACKGROUND

Airline communication datalink technology provides air-to-ground communication links between aircraft and ground stations. A datalink communication system allows communications in real-time with aircraft practically anywhere in the world. Examples of ground stations include air traffic control (ATC) stations and airline operational communication (AOC) stations. Examples of communication systems that may pass datalink signals include very high frequency (VHF) Aero Nautical Radio datalink systems, satellite communication (SATCOM) systems, and cellular wireless systems.

AOC messages typically serve to enhance airline operations and provide beneficial functionality to increase efficiency and reduce fuel consumption. Typical AOC messages exchanged between the AOC and aircraft relate to aircraft performance, takeoff data, fuel data, wind data, temperature data, etc. ATC messages typically relate to maintaining a safe, orderly, and expeditious traffic flow in a global air traffic system. During each phase of flight, data is required to be communicated to ground stations through the datalink system.

In current systems, each downlink content is shown on its own page and a single downlink message is sent at a given time. Sending a single message at a time may result in using a large amount of network bandwidth to accommodate multiple small messages. In addition, some of the downlink pages may require that mandatory data be filled in before the messages can be sent to a ground station. A crew member needs to traverse though different pages to identify pages that require mandatory data. Having to traverse through multiple downlink pages to identify pages that require mandatory data increases the pilot workload.

For the reasons stated above and for other reasons stated below which will become apparent to those skilled in the art upon reading and understanding the present specification, there is a need in the art for improved system that effectively, efficiently, and intuitively generates, displays, and transmits downlink messages.

SUMMARY OF INVENTION

The following summary is made by way of example and not by way of limitation. It is merely provided to aid the reader in understanding some of the aspects of the subject matter described. Embodiments provide a consolidated collapsible/expandable panel layout of a downlink content display that is populated with downlink content messages from a customer defined modifiable database based on a defined event associated with at least one of a vehicle and a vehicle path.

In one embodiment, a method to provide a user interface for datalink messages is provided. The method includes, displaying a plurality of downlink content messages associated with at least one of downlink requests and reports on a consolidated panel layout of a downlink content display based on a defined event associated with at least one of a vehicle and a vehicle travel path wherein the plurality of downlink content messages are provided by a customer defined modifiable database that includes programmable instructions; providing a user option to select which of the plurality of downlink content messages provided in the consolidated panel layout of a downlink content display to include in a combined downlink content message; and communicating the combined downlink content message to a remote location upon activation of a send input from the user.

In another embodiment, a method of providing a user interface for datalink messages is provided. The method includes determining a then current phase of travel of a vehicle; identifying a plurality of downlink content messages associated with the determined phase of travel from a customer defined modifiable database; displaying at least the plurality of downlink content messages on a consolidated panel layout of a downlink content display based on the then current phase of travel of the vehicle, wherein the plurality of downlink content messages are provided by the customer defined modifiable database that includes programmable instructions; providing a user option to select which of the plurality of downlink content messages provided in the consolidated panel layout of the downlink content display to include in a combined downlink content message; and communicating the combined downlink content message to a remote location upon activation of a send input from the user.

In still another embodiment, a vehicle communication system including a transceiver, a modifiable database, at least one sensor, and a communication controller is provided. The transceiver is configured to receive uplink messages and transmit downlink messages. The modifiable database contains at least customer defined messages to be downlinked. The user interface includes a downlink content display and user input functions that enable a user to select which of a plurality of downlink content messages provided in a consolidated panel layout of the downlink content display to include in a combined downlink content message. The communication controller is in communication with the transceiver, the modifiable database, the user interface, and the at least one sensor. The communication controller is configured to determine a phase of travel based at least in part on an output signal of the at least one sensor. The communication controller is further configured to display a plurality of downlink content messages from the modifiable database based on the determined phase of travel on the downlink content display of the user interface. The communication controller is also configured to communicate the combined downlink content message of the user selected downlink content to a remote location via the transceiver upon activation of a send input on the user interface.

BRIEF DESCRIPTION OF THE DRAWINGS

The present invention can be more easily understood and further advantages and uses thereof will be more readily apparent, when considered in view of the detailed description and the following figures in which.

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Embodiments of the present invention provide a communication system that includes a user interface with a panel-styled layout (herein after "panel layout") that allows for easy updating and reviewing of downlink message content. In some examples, a panel layout is provided based on a then current phase of travel. Further, a downlink panel layout, in an example, allows a simple mechanism to fill-in downlink content. Some example embodiments provide a mechanism to combine the pending reminders, reports, and requests for better usage of the communication network that is communicating the downlink content messages. Some embodiments provide a mechanism to prioritize the downlink message to be sent. Although the description may discuss application of embodiments in an aeronautical realm, embodiments may have application with communication systems relating to other types of vehicles such as but not limited to, motor vehicles, ships, spacecrafts, etc.

Figure 1:
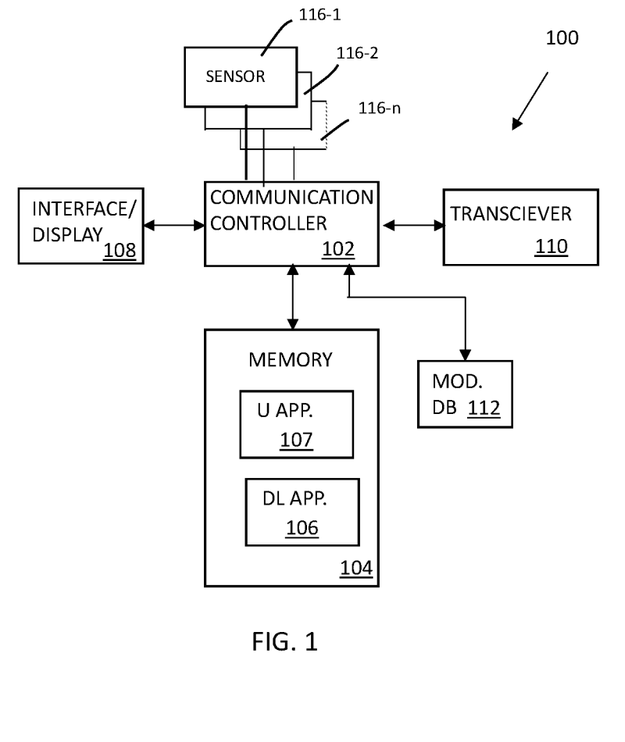
FIG. 1 is a block diagram of a communication system according to an example aspect of the present invention.

Referring to FIG. 1, a communication system 100 with a consolidated user interface for datalink messages of one exemplary embodiment is illustrated. The datalink messages may include downlink request and reports and requested uplink messages. The communication system includes at least one communication controller 102 to control operations of the communication system 100. The communication system 100 further includes a memory 104 to store operating instructions of the communication controller 102 and information gathered from a user interface 108 which may include a display to present a downlink panel layout. The operating instructions may include a downlink application (DL App.) 106 having instructions implemented by the communication controller 102 in implementing a downlink communication and a user application (U App.) 107 that includes code managing logic instructions for position and state of visual elements provided in the interface/down link content display 108. The interface 108 may include for example, accept, reject, send, print, etc. options. The DL application 106 may include an interpreter that provides instructions to the controller 102 on how to read instructions from the modifiable database 112 discussed below. The communication system 100 further includes a transceiver 110. The transceiver 110 includes a transmitter and a receiver to transmit downlink messages and receive uplink messages.

In general, the communication controller 102 may include any one or more of a processor, microprocessor, a digital signal processor (DSP), an application specific integrated circuit (ASIC), a field program gate array (FPGA), or equivalent discrete or integrated logic circuitry. In some example embodiments, communication controller 102 may include multiple components, such as any combination of one or more microprocessors, one or more processors, one or more DSPs, one or more ASICs, one or more FPGAs, as well as other discrete or integrated logic circuitry. The functions attributed to the communication controller 102 herein may be embodied as software, firmware, hardware or any combination thereof. The communication controller 102 may be part of a system processor or a component processor. As discussed above, the memory 104 may include computer-readable operating instructions that, when executed by the communication controller 102 provides functions of the communication system 100. Such functions may include the functions of providing a panel layout based on a phase of a travel described below. The computer readable instructions may be encoded within the memory 104. Memory 104 may comprise computer readable storage media including any volatile, nonvolatile, magnetic, optical, or electrical media, such as, but not limited to, a random access memory (RAM), read-only memory (ROM), non-volatile RAM (NVRAM), electrically-erasable programmable ROM (EEPROM), flash memory, or any other storage medium.

The communication system further includes a modifiable database (MOD. DB) 112 that includes customer defined messages to be presented in the downlink content display 108. The modifiable database 112 allows a customer, such as an AOC station customer in the avionic realm, to customize information or messages to provide to a user through a consolidate downlink panel layout in the downlink content display 108. The modifiable database 112 may be located within the vehicle or at a remote location. Also included in this example, is a plurality of sensors 116-1 through 116-n which can be generally identified by 116. The sensors may include, speed sensors, weight on wheel sensors, altitude sensors, position sensors, etc. The communication controller 102 in one example determines a phase of travel based on a vehicle travel plan and information from at least one of the sensors 116.

In the aeronautical realm, the interface/downlink content display 108 may be a cockpit display system (CDS) that conveys requests and reports using a known communication standard. The standard provides protocols that allow graphical display content communications used by the user application 107 for message exchange. In an example, the standard may define CDS as a runtime interpreter capable of displaying one or more elements from a finite library of building blocks called widgets based on information contained in external layout files of the modifiable database 112.

Figure 2:
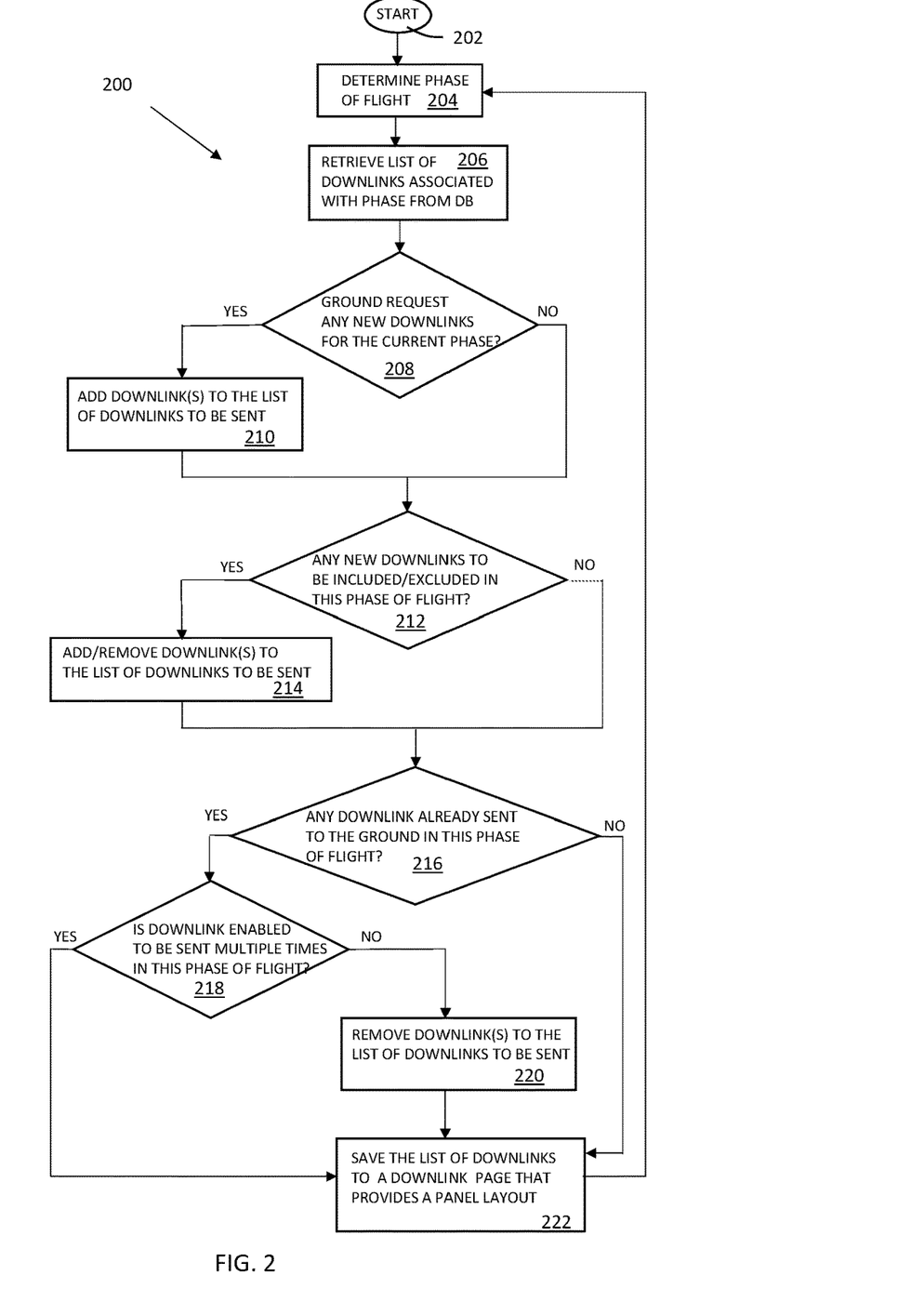
FIG. 2 illustrates a flow diagram of a process for creating a panel page for downlink messages based on a current phase of flight according to an example aspect of the present invention.

Referring to FIG. 2, a flow diagram 200 of a process for creating a panel page for downlink messages based on a current phase of flight shown on the downlink content display 108 of an example embodiment is illustrated. Flow diagram 200 is provided as a series of sequential blocks. The sequence of the blocks may be in a different order or even run in parallel in other embodiments. Hence embodiments are not limited to the sequential order of the blocks illustrated in FIG. 2.

In flow diagram 200, the process starts a block 202. At block 204, the phase of flight is determined. The phase of flight (or phase of travel) may be determined using at least one of sensor information, a vehicle travel plan path, and travel event. The travel event may include a state of flight (emergency state), an environmental state event and a communication state event. The sensors 116, providing the sensor data, may include weight on wheels sensors to determine if the vehicle is on the ground or not, position sensors to determine the location of vehicle, speed sensors to determine the speed of vehicle, altimeter sensors to determine the altitude of the vehicle. Other sensors 116 that may be used includes temperature sensors, angle of attack sensors, flow sensors, pressure sensors, oxygen sensors, fuel quantity sensors, vibration sensors, attitude sensors, and communication sensors. In one example, sensor information from the sensors 116 may be compared with the vehicle flight plan path to determine the phase of flight (or phase of travel). In other examples, the sensor data itself provides information in determining a travel event that may be used to determine a phase of travel.

Based on the phase of travel, determined at block 204, a list of downlinks messages that are associated with the determined phase of flight are retrieve from the database 112 at block 206. It is then determined at block 208 if there are any new downlink requests from a ground station for the current phase of flight that are not on the list. If there are new downlink requests, they are added to the list of downlinks at block 210. It is then determined if any downlinks are to be included or excluded in the current phase of flight at block 212. The determination may be done, in an example, with a logic unit defined programmable code (user application 107) stored in the memory 104 or database 112 and executed by the communication controller 102. Generated downlinks may be provided by loadable modifiable database instructions. If there are new downlinks to be added or removed, they are added or removed from the list at block 214.

It is then determined at block 216 if any of the downlinks in the list have already been sent to a ground station during the current phase of flight. If it is determined that a downlink has been sent to a ground station during the current phase of flight at block 216, it is then determined at block 218 if the downlink is enabled to be sent multiple times during this phase of flight. If it is determined the downlink is enabled to be sent multiple times during the current phase of flight at block 218, the downlink is saved in a flight phase panel page at block 222.

If it is determined at block 218, the downlink is not enabled to be sent multiple times, the downlink is removed from the list of downlinks to be sent at block 220. The process then continues at block 222 where the list of downlinks to be sent are saved in a phase downlink page that provides a panel layout that is displayed in the interface 108.

The process may then continue at block 204. A user defined frequency of when the process repeats is provided in an embodiment. Although, the process uses the phases of flight in determining when an action is to take place, any other defined event or occurrence associated with a vehicle or flight path (travel path) may be used for the determination.

Figure 3:
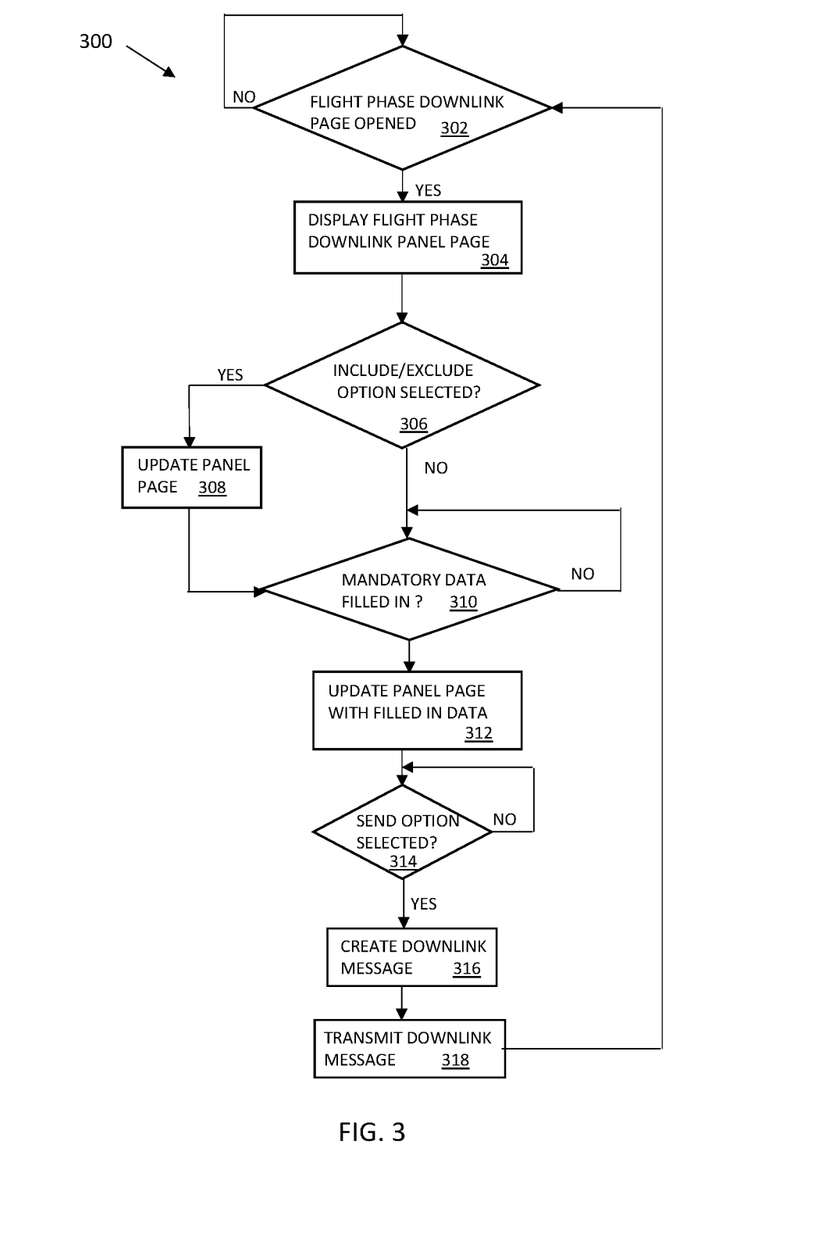
FIG. 3 illustrates a flow diagram for creating downlink messages through a panel page according to an example aspect of the present invention.

FIG. 3 illustrates flow diagram 300 for creating downlink content messages through a panel page of an example that uses a panel layout. Flow diagram 300 is provided as a series of sequential blocks. The sequence of the blocks may be in a different order or even run in parallel in other embodiments. Hence embodiments are not limited to the sequential order of the blocks illustrated in FIG. 3.

Flow diagram 300 starts when a crew member (or user) opens up a phase downlink page at block 302. Upon opening the phase downlink page, the downlink content display 108 provides a list of downlinks to be sent in the flight phase in a consolidated panel layout is displayed by the interface 108 at block 304. The consolidated panel layout may contain include/exclude downlink message selection options for at least some of the downlink messages in panel layout, as illustrated in the panel layout 400 of FIG. 4A discussed below. Further, the panel layout may include a mandatory fill status as well as highlights of the downlink messages in the panel layout. It is determined at block 306 if an include/exclude option is selected. If an include or exclude option has been selected relating to a specific downlink information at block 306, the panel layout is updated accordingly at block 308 to reflect the indicated change.

In this example, it is then determined if there are any mandatory data that needs to be filled in before a downlink message can be sent at block 310. Further in an example, an option to expand the panel page is provided. Once the mandatory data is filled in at block 310, the panel page is updated with the filled in data at block 312. In this example, a send option link is then monitored at block 314. Once the send link is activated at block 314, combined downlink content message is created that includes all the information contained in the panel layout at block 316. The combined downlink content message is then transmitted at block 318 and the process continues at block 302 when another phase downlink page is opened.

Figure 4A:
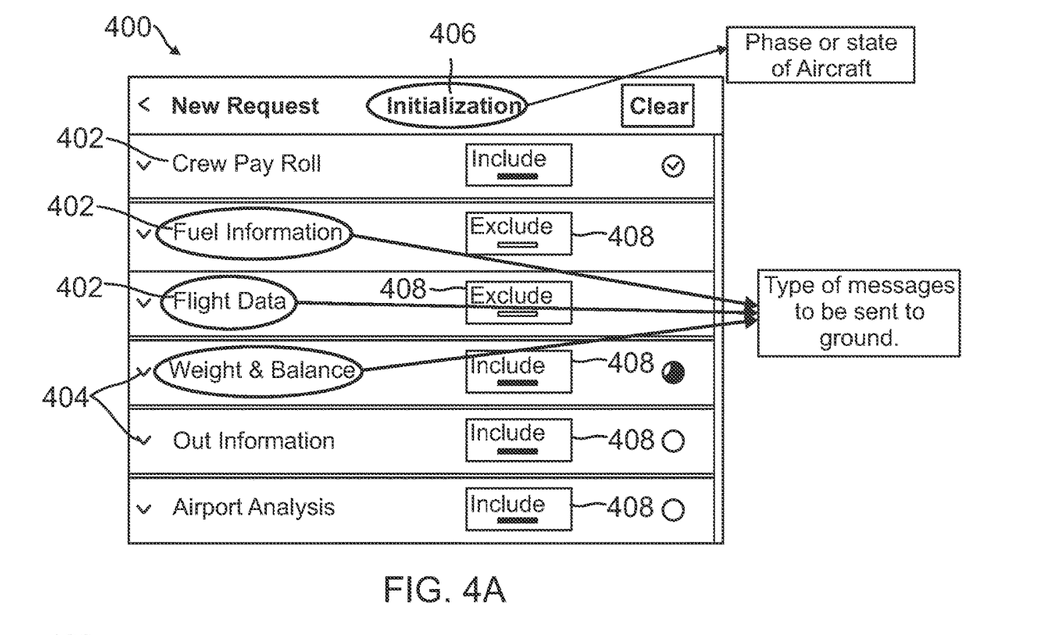
FIG. 4A illustrates a panel layout according to an example aspect of the present invention.
Figure 4B:
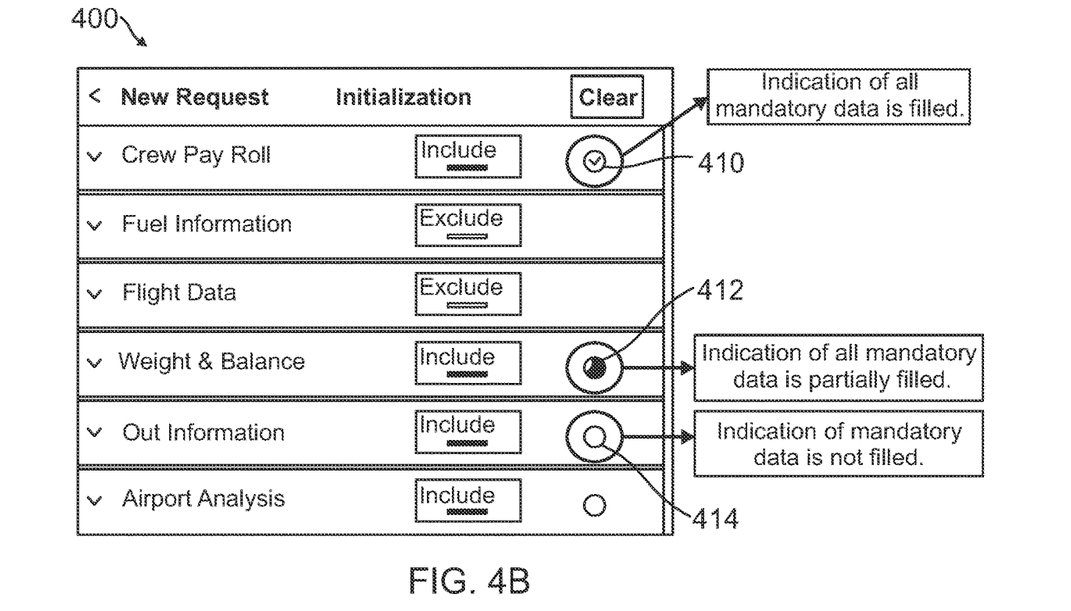
FIG. 4B further illustrates the panel layout of FIG. 4A.

FIGS. 4A and 4B illustrate an example of a consolidated panel layout 400 provided in a display of the interface/display 108 discussed above. The panel layout 400 in this example, includes potential downlink messages 402. The examples of downlink messages 402 in this example includes crew pay roll, fuel information, flight data, weight and balance, out information and airport analysis. More information regarding a message may be obtained by activating an input function such as an associated more information activation button 404. Also illustrated in the panel page is the current phase or state 406 of the aircraft. In this example, the phase or state 406 is an "initialization" phase or state. That would be a phase were, in an aircraft example, the aircraft is being prepared for flight. Also illustrated in FIG. 4A is the include/exclude activation buttons 408 input functions (user option) associated with the downlink messages 402. The include/exclude activation buttons 408 allow crew members to manually modify the inclusion or exclusion of a message to be downlinked. In an example, an initial default status of inclusion or exclusion is determined by the current phase or state of the aircraft. In an example, priority/order of the downlink panel display and the default include/exclude options may be controlled through uplinks/state/logic units.

The panel layout 400 further includes mandatory data status indicators 410, 412 and 414, best illustrated in FIG. 4B, associated with each message 402 that include that mandatory data is entered. Mandatory data status indicator 410 indicates all the mandatory data has been entered. Mandatory data status indicator 412 indicates that some of the mandatory data has been entered and mandatory indicator 414 indicates none of the mandatory data has been entered for the associated message 402. In an example, mandatory data filling status indicators may be percentage based. Further in an example, colors may be used to indicate an amount of mandatory information entered.

The panel layout 400 allows the crew member to easily identify whether a given message content can be included or excluded in the downlink message. By including more messages, than would typically be allowed in current systems in a single downlink, a repetitive network transmission header for multiple messages can be reduced therein saving bandwidth and data consumption on the communication network.

Figure 5A:
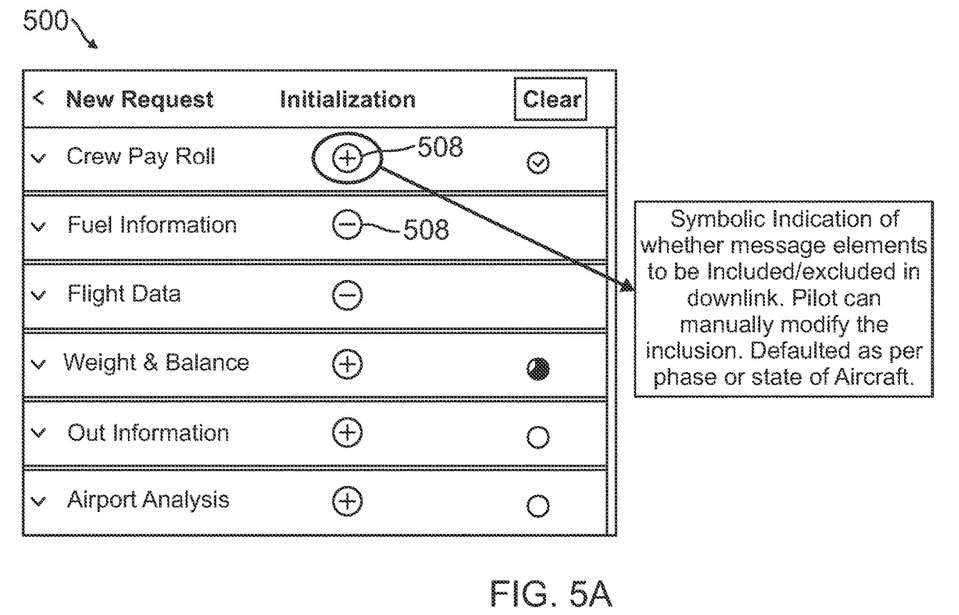
FIG. 5A illustrates a panel layout according to an example aspect of the present invention.
Figure 5B:
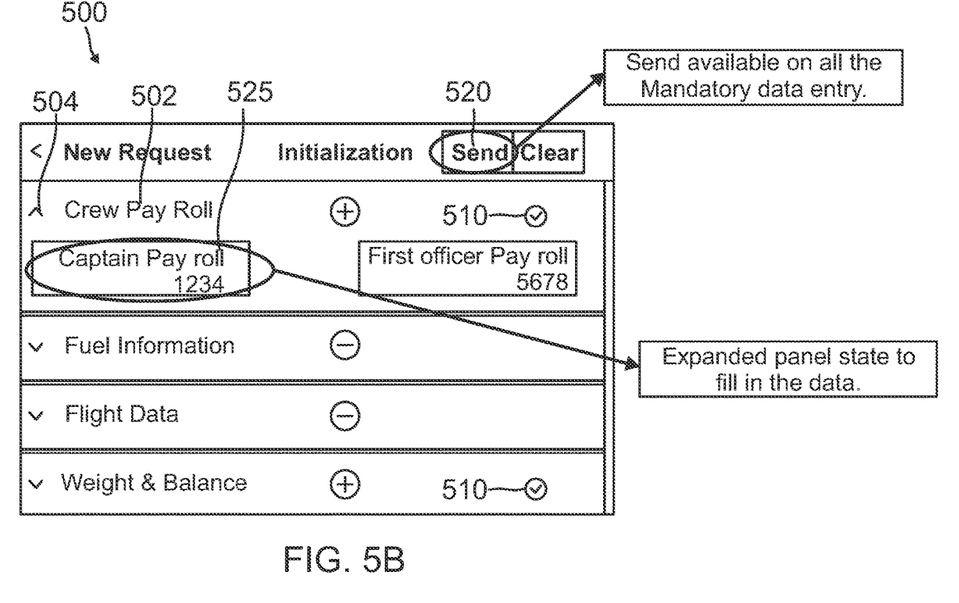
FIG. 5B illustrates a panel layout with an activated expanded panel state according to an example aspect of the present invention.
Figure 5C:
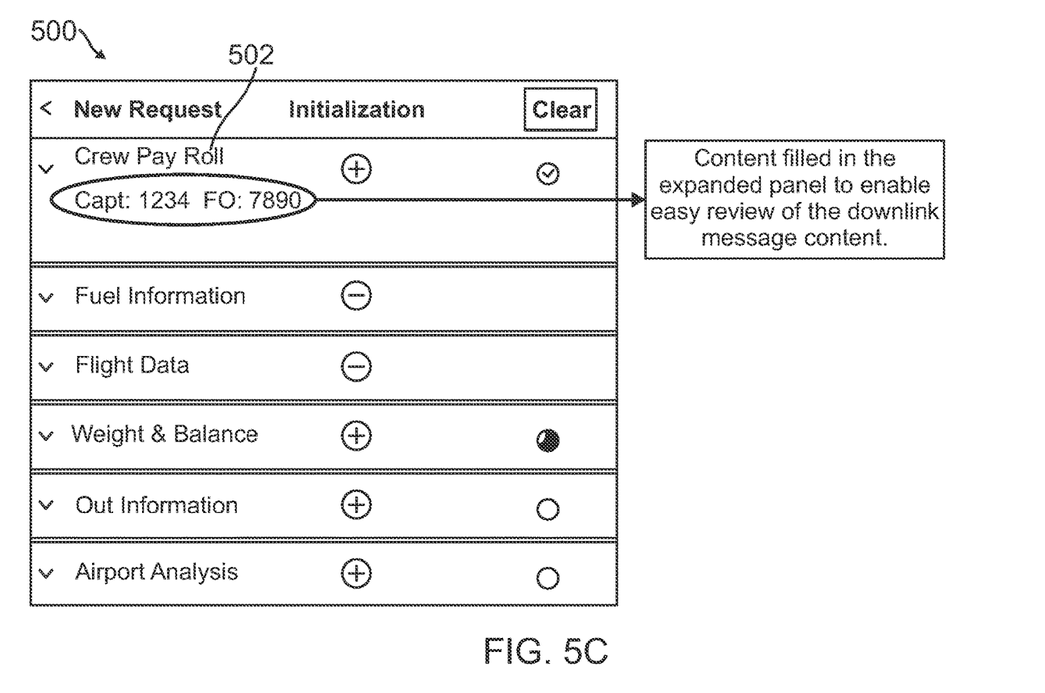
FIG. 5C illustrates a panel layout including an activated extended panel with content filled in according to an example aspect of the present invention.
Figure 5D:
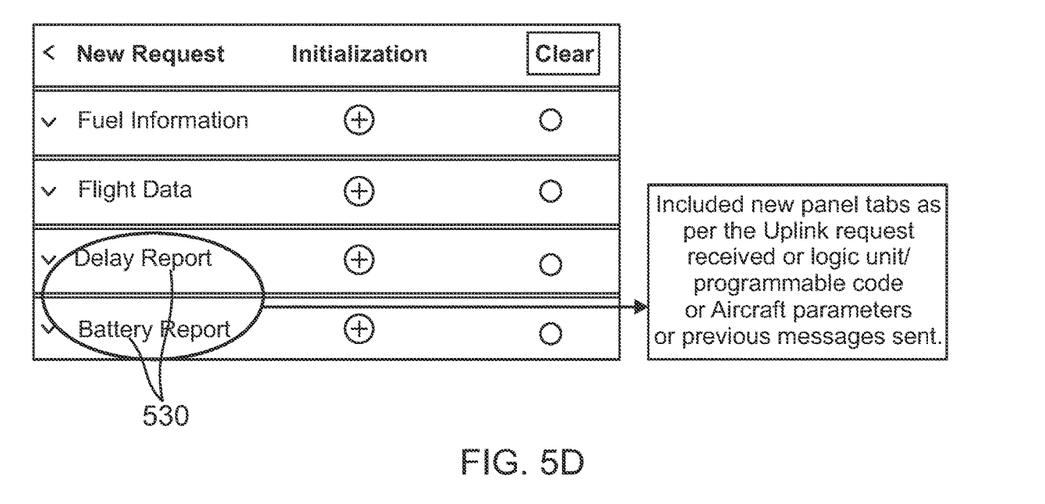
FIG. 5D illustrates a panel layout that includes new panel tabs according to an example aspect of the present invention.

FIG. 5A illustrates an alternative example, where the panel layout 500 includes plus or minus activation buttons 508 instead of the include or exclude activation buttons 408 discussed above. FIG. 5B illustrates an example panel layout that illustrates that a send activation button 520 input function becomes available when all the messages that require mandatory data are entered (as indicated by mandatory data status indicator 510). The example panel layout 500 also illustrates when the crew member activates an associated more information activation button 504. Once the more information activation button 504 is activated, an extended panel is provided with additional information. In this example, the extended panel 525 provide an indication of the mandatory information that needs to be entered that is associated with the message 502. FIG. 5C illustrates panel layout 500 once the mandatory information is entered for message 502. The page layout 500 may be updated to include more messages. FIG. 5D illustrates the panel layout 500 with included new messages 530. The new messages may have come from a received uplink request from a ground station, a logic unit/programmable code, aircraft defined parameters or even previous messages sent. The minimized panel layout 500 of FIG. 5D illustrates only the downlink content in this example. In an example, each message in a page layout may be associated with a ground-based software tool (GBST) that is encoded with logic on whether the message can be included or excluded based on a crew selection of an include/exclude activation button in the page layout. Also in an example, at least some of the messages are included or excluded on a conditional basis. Besides a send option 520 and include or exclude (delete option) other options that may be provided include a clear option and a print option. Also, for uplink messages, an accept option may be provided providing the crew member an option to accept an uplink message.

Figure 6:
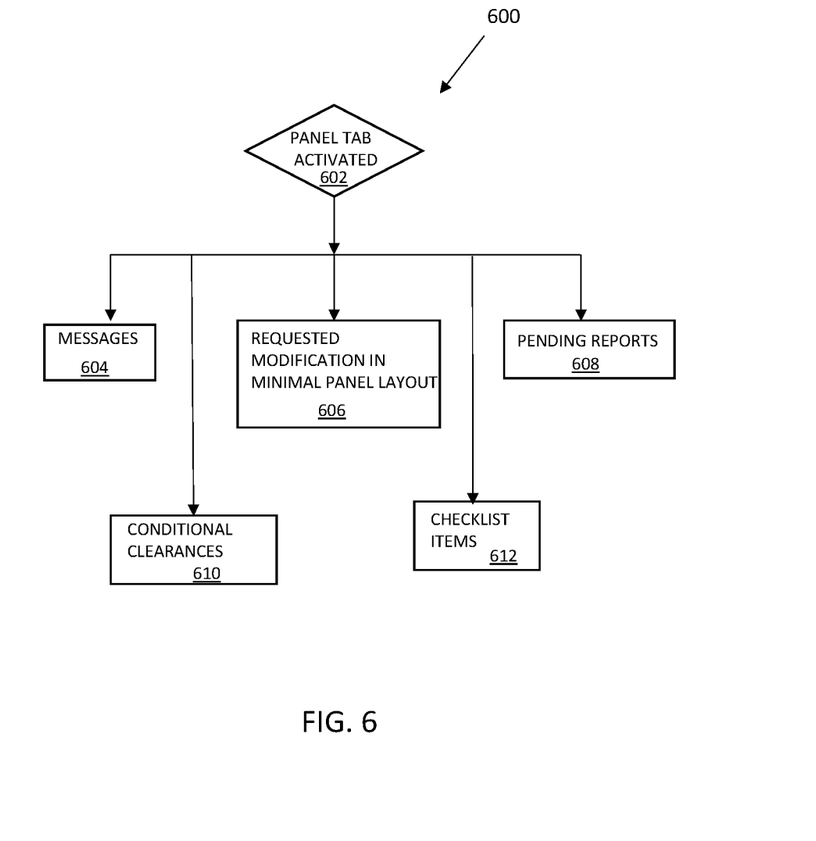
FIG. 6 illustrates a flow diagram to access panel layouts according to an example aspect of the present invention.

Other information may be provided in other consolidated panel layouts upon a panel tab activation. For example, a flow diagram 600 to access panel layouts is illustrated in FIG. 6. Flow diagram 600 is provided as a series of sequential blocks. The sequence of the blocks may be in a different order or even run in parallel in other embodiments. Hence embodiments are not limited to the sequential order of the blocks illustrated in FIG. 6.

At block 602 it is determined if a panel tab is activated requested information be displayed in the panel layout. The example provided in flow diagram 600 includes messages at block 604. The messages may include, but are not limited to, altitude, speed, route, reason for modification, and free text. The panel layout may provide for include or exclude options to be selected by the crew as described in above examples. At block 606 the information requested is modification information. The modification information requested in a panel layout provides a review of the requested modifications in the flight plan and is provided to the crew for easy walkthrough of previous requests created by the crew. The modification information may be shown in a minimal panel to easily review the multiple message content.

If requested, pending reports may be provided in panel layout at block 608. The pending reports may be shown in a panel layout that provides all the pending reports which may be combined. Further at block 610, all conditional clearances may be shown in a panel layout to illustrate all pending conditional clearances. Also illustrated at block 612, is checklist item information that may be provided in page layout upon activation of the panel tab. This information may include checklist item status that is sent to a ground station.

Example Embodiments

Example 1 is a method to provide a consolidated user interface for datalink messages, the method includes, displaying a plurality of downlink content messages associated with message requests on a consolidated panel layout of a downlink content display based on a defined event associated with at least one of a vehicle and a vehicle travel path wherein the plurality of downlink content messages are provided by a customer defined modifiable database that includes programmable instructions; providing a user option to select which of the plurality of downlink content messages provided in the consolidated panel layout of a downlink content display to include in a combined downlink content message; and communicating the combined downlink content message to a remote location upon activation of a send input from the user.

Example 2 includes the method of Example 1, wherein the defined event associated with at least one of a vehicle and a vehicle path is a phase of travel. The method further including, determining the phase of travel; identifying the plurality of downlink content messages associated with determined phase of travel from the customer defined modifiable database; and displaying the plurality of downlink content messages in the consolidated panel layout of the downlink content display.

Example 3 includes the method of any of the Example 2, further including determining if the remote location has requested any new downlink content messages at a then current phase of travel; and when it is determined that the remote location has requested at least one new downlink content message, adding the at least one new downlink content message to the displayed plurality of downlink content messages.

Example 4 includes the method of any of the Examples 2-3, further including determining if a downlink content message of the plurality of downlink content messages has already been sent to the remote location; when it is determined that the downlink content message has already been sent to the remote location, determining if the downlink content message is a message type that is enabled to be sent multiple times to the remote location in a then current phase of travel; and when it is determined that the downlink content message is a message type that is enabled to be sent multiple times during the then current phase of travel, displaying the already sent downlink content message with the plurality of downlink content messages.

Example 5 includes the method of any of the Examples 2-4, further including automatically including critical downlink content messages associated with a then current phase of travel in the displayed plurality of downlink content messages.

Example 6 includes the method of any of the Examples 1-5, wherein the customer defined modifiable database includes pilot reminder downlink messages.

Example 7 includes the method of any of the Examples 1-6, further including at least one of: displaying all pending downlink content messages in the consolidated panel layout of a downlink content display; providing at least one of a send option, a clear option, delete option, and print option related to the downlink content messages displayed on the consolidated panel layout of a downlink content display; displaying each downlink content message whether it is created automatically and is requested by ground; and providing a prioritization of the downlink content messages.

Example 8 includes the method of any of the Examples 1-7, further including requiring that mandatory data associated with downlink content messages that require mandatory data be filled in before communicating the combined downlink content message to the remote location.

Example 9 includes the method of Example 8, further including providing an indication of progress of user completion in filling the mandatory data.

Example 10 includes a method of providing a consolidated user interface for datalink messages. The method includes determining a then current phase of travel of a vehicle; identifying a plurality of downlink content messages associated with the determined phase of travel from a customer defined modifiable database; displaying at least the plurality of downlink content messages on a consolidated panel layout of a downlink content display based on the then current phase of travel of the vehicle, wherein the plurality of downlink content messages are provided by the customer defined modifiable database that includes programmable instructions; providing a user option to select which of the plurality of downlink content messages provided in the consolidated panel layout of the downlink content display to include in a combined downlink content message; and communicating the combined downlink content message to a remote location upon activation of a send input from the user.

Example 11 includes the method of Example 10, further including determining if the remote location has requested any new downlink content messages at the then current phase of travel; and adding the new downlink content message to the displayed plurality of downlink content messages when it is determined that the remote location has requested at least one new downlink content message.

Example 12 includes the method of any of the Examples 10-11, further including determining if a downlink content message of the plurality of downlink content messages has already been sent to the remote location; determining if the already been sent downlink content message is a message type that is enabled to be sent multiple times to the remote location in a then current phase of travel to the remote location; and displaying the already been sent downlink content message with the downlink content messages when it is determined that the already been sent downlink content message is a message type that is enabled to be sent multiple times during the then current phase of travel.

Example 13 includes the method of any of the Examples 10-12, wherein the phase of travel is determined by at least one of sensor information, a vehicle travel plan path, and travel event, further wherein the travel event includes at least one of a state of flight, an environmental state event, and a communication state event.

Example 14 includes the method of any of the Examples 10-13 further including at least one of providing at least one of a send option, a clear option, delete option, accept option, and print option relating to datalink messages displayed on the consolidated panel layout of a downlink content display; displaying each downlink content message whether it is one of created automatically and is requested by ground; providing a prioritization of the downlink content messages; and automatically including critical downlink content messages associated with a then current phase of travel in the displayed plurality of downlink content messages.

Example 15 includes a vehicle communication system including a transceiver, a modifiable database, at least one sensor, and a communication controller. The transceiver is configured to receive uplink messages and transmit downlink messages. The modifiable database contains at least customer defined messages to be downlinked. The user interface includes a downlink content display and user input functions that enable a user to select which of a plurality of downlink content messages provided in a consolidated panel layout of the downlink content display to include in a combined downlink content message. The communication controller is in communication with the transceiver, the modifiable database, the user interface, and the at least one sensor. The communication controller is configured to determine a phase of travel based at least in part on an output signal of the at least one sensor. The communication controller is further configured to display a plurality of downlink content messages from the modifiable database based on the determined phase of travel on the downlink content display of the user interface. The communication controller is also configured to communicate the combined downlink content message of the user selected downlink content to a remote location via the transceiver upon activation of a send input on the user interface.

Example 16 includes the vehicle communication system of Example 15, further including at least one memory to store at least a downlink application and a user application that includes operating instructions implemented by the communication controller.

Example 17 includes the vehicle communication system of any of the Examples 15-16, wherein the communication controller is further configured to add at least one new downlink content message to the displayed plurality of downlink content messages when it is determined that the remote location has requested at least one new downlink content message during a current phase of travel.

Example 18 includes the vehicle communication system of any of the Examples 15-16, wherein the communication controller is further configured to: determine if a downlink content message of the plurality of downlink content messages has already been sent to the remote location; determine if the downlink content message is a message type that is enabled to be sent multiple times to the remote location in a then current phase of travel when it is determined that the downlink content message has already been sent to the remote location; and display the already sent downlink content message with the plurality of downlink content messages when it is determined that the downlink content message is a message type that is enabled to be sent multiple times during the then current phase of travel.

Example 19 includes the vehicle communication system of any of the Examples 15-18, wherein the communication controller is further configured to require that mandatory data associated with downlink content messages that require mandatory data be filled in before communicating the combined downlink content message to the remote location.

Example 20 includes the vehicle communication system of any of the Examples 15-19, wherein the at least one sensor is at least one of a speed sensor, a weight on wheel sensor, an altitude sensors, a position sensor, temperature sensor, angle of attack sensor, flow sensor, pressure sensor, oxygen sensor, fuel quantity sensor, vibration sensor, attitude sensor, and a communication sensor.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A method to provide a consolidated user interface for datalink messages, the method comprising:
displaying a plurality of downlink content messages associated with datalink messages on a consolidated panel layout of a downlink content display based on a defined event associated with at least one of a vehicle and a vehicle travel path, wherein the plurality of downlink content messages are provided by a customer defined modifiable database that includes programmable instructions;
providing a user option to select which of the plurality of downlink content messages provided in the consolidated panel layout consolidated panel layout of a downlink content display to include in a combined downlink content message;
determining if a remote location has requested any new downlink content messages at a then current phase of travel;
when it is determined that the remote location has requested at least one new downlink content message, adding the at least one new downlink content message to the combined downlink content message; and
communicating the combined downlink content message to a remote location upon activation of a send input from the user.

2. The method of claim 1, wherein the defined event associated with at least one of a vehicle and a vehicle path is the phase of travel, the method further including:
determining the phase of travel;
identifying the plurality of downlink content messages associated with determined phase of travel from the customer defined modifiable database; and
displaying the plurality of downlink content messages in the consolidated panel layout of the downlink content display.

3. The method of claim 2, further comprising:
determining if a downlink content message of the plurality of downlink content messages has already been sent to the remote location;
when it is determined that the downlink content message has already been sent to the remote location, determining if the downlink content message is a message type that is enabled to be sent multiple times to the remote location in a then current phase of travel; and
when it is determined that the downlink content message is a message type that is enabled to be sent multiple times during the then current phase of travel, displaying the already sent downlink content message with the plurality of downlink content messages.

4. The method of claim 2, further comprising:
automatically including critical downlink content messages associated with a then current phase of travel in the displayed plurality of downlink content messages.

5. The method of claim 1, wherein the customer defined modifiable database includes pilot reminder downlink content messages.

6. The method of claim 1, further comprising at least one of:
displaying all pending downlink content messages in the consolidated panel layout of the downlink content display;
providing at least one of a send option, a clear option, delete option, and print option related to the downlink content messages displayed on the consolidated panel layout of the downlink content display;
displaying each downlink content message whether it is one of created automatically and is requested by ground; and
providing a prioritization of the downlink content messages.

7. The method of claim 1, further comprising:
requiring that mandatory data associated with downlink content messages that require mandatory data be filled in before communicating the combined downlink content message to the remote location.

8. The method of claim 7, further comprising:
providing an indication of progress of user completion in filling the mandatory data.

9. A method of providing a consolidated user interface for datalink messages, the method comprising:
determining a then current phase of travel of a vehicle;
identifying a plurality of downlink content messages associated with the determined phase of travel from a customer defined modifiable database;
displaying at least the plurality of downlink content messages on a consolidated panel layout of a downlink content display based on the then current phase of travel of the vehicle, wherein the plurality of downlink content messages are provided by the customer defined modifiable database that includes programmable instructions;
providing a user option to select which of the plurality of downlink content messages provided in the consolidated panel layout of the downlink content display to include in a combined downlink content message;
determining if the remote location has requested any new downlink content messages at the then current phase of travel;
adding the new downlink content message to the displayed plurality of downlink content messages when it is determined that the remote location has requested at least one new downlink content message; and
communicating the combined downlink content message to a remote location upon activation of a send input from the user.

10. The method of claim 9, further comprising:
determining if a downlink content message of the plurality of downlink content messages has already been sent to the remote location;
determining if the already been sent downlink content message is a message type that is enabled to be sent multiple times to the remote location in a then current phase of travel to the remote location; and displaying the already been sent downlink content message with the plurality of downlink content messages when it is determined that the already been sent downlink content message is a message type that is enabled to be sent multiple times during the then current phase of travel.

11. The method of claim 9, wherein the phase of travel is determined by at least one of sensor information, a vehicle travel plan path, and travel event, further wherein the travel event includes at least one of a state of flight, an environmental state event, and a communication state event.

12. The method of claim 9, further comprising at least one of:

providing at least one of a send option, a clear option, delete option, accept option, and print option relating to datalink messages displayed on the consolidated panel layout of a downlink content display;

displaying each downlink content message whether it is one of created automatically and is requested by ground;

providing a prioritization of the downlink content messages; and automatically including critical downlink content messages associated with a then current phase of travel in the displayed plurality of downlink content messages.

13. A vehicle communication system comprising:

a transceiver to receive uplink messages and transmit downlink messages;

a modifiable database containing at least customer defined messages to be downlinked;

a user interface including a downlink content display and user input functions that enable a user to select which of a plurality of downlink content messages provided in a consolidated panel layout of the downlink content display to include in a combined downlink content message;

at least one sensor; and a communication controller in communication with the transceiver, the modifiable database, the user interface, and the at least one sensor, the communication controller configured to determine a phase of travel based at least in part on an output signal of the at least one sensor, the communication controller further configured to display a plurality of downlink content messages from the modifiable database based on the determined phase of travel on the downlink content display of the user interface, the communication controller also configured to communicate the combined downlink content message of the user selected downlink content to a remote location via the transceiver upon activation of a send input on the user interface; wherein the communication controller is further configured to add at least one new downlink content message to the displayed plurality of downlink content messages when it is determined that the remote location has requested at least one new downlink content message during a current phase of travel.

14. The vehicle communication system of claim 13, further comprising:

at least one memory to store at least a downlink application and a user application that includes operating instructions implemented by the communication controller.

15. The vehicle communication system of claim 13, wherein the communication controller is further configured to:

determine if a downlink content message of the plurality of downlink content messages has already been sent to the remote location;

determine if the downlink content message is a message type that is enabled to be sent multiple times to the remote location in a then current phase of travel when it is determined that the downlink content message has already been sent to the remote location; and display the already sent downlink content message with the plurality of downlink content messages when it is determined that the downlink content message is a message type that is enabled to be sent multiple times during the then current phase of travel.

16. The vehicle communication system of claim 13, wherein the communication controller is further configured to require that mandatory data associated with downlink content messages that require mandatory data be filled in before communicating the combined downlink content message to the remote location.

17. The vehicle communication system of claim 13, wherein the at least one sensor is at least one of a speed sensor, a weight on wheel sensor, an altitude sensors, a position sensor, temperature sensor, angel of attack sensor, flow sensor, pressure sensor, oxygen sensor, fuel quantity sensor, vibration sensor, attitude sensor, and a communication sensor.

* * * * *